(12) United States Patent
Seong

(10) Patent No.: US 10,878,267 B2
(45) Date of Patent: Dec. 29, 2020

(54) IDENTIFICATION CODE RECOGNITION SYSTEM AND METHOD

(71) Applicants: HYUNDAI MOTOR COMPANY, Seoul (KR); KIA MOTORS CORPORATION, Seoul (KR)

(72) Inventor: Ha Seung Seong, Daejeon (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 181 days.

(21) Appl. No.: 16/146,421

(22) Filed: Sep. 28, 2018

(65) Prior Publication Data

US 2020/0005067 A1    Jan. 2, 2020

(30) Foreign Application Priority Data

Jun. 27, 2018   (KR) ........................ 10-2018-0073968

(51) Int. Cl.
| | | |
|---|---|---|
| *B44B 3/00* | (2006.01) | |
| *B44C 1/22* | (2006.01) | |
| *B60R 13/10* | (2006.01) | |
| *G06K 9/20* | (2006.01) | |
| *G06K 9/22* | (2006.01) | |
| *G06K 9/32* | (2006.01) | |

(52) U.S. Cl.
CPC ............ *G06K 9/3241* (2013.01); *B44C 1/225* (2013.01); *B60R 13/10* (2013.01); *G06K 9/2063* (2013.01); *G06K 2009/3225* (2013.01)

(58) Field of Classification Search
None
See application file for complete search history.

(56) References Cited

U.S. PATENT DOCUMENTS 5,932,119 A * 8/1999 Kaplan ................ B23K 26/032
219/121.68
5,999,647 A * 12/1999 Nakao ................ G06K 9/00463
382/177

(Continued)

FOREIGN PATENT DOCUMENTS

| EP | 0440814 A1 * | 8/1991 | ............. G06K 17/00 |
| KR | 10-0564522 B | 6/2005 | |
| KR | 10-2016-0051312 A | 5/2016 | |

OTHER PUBLICATIONS

Park et al., "Method and apparatus for recognizing serial number of paper money," International Patent Application (WO 2007/ 011188) (Year: 2007).*

*Primary Examiner* — Soo Shin
(74) *Attorney, Agent, or Firm* — Brinks Gilson & Lione

(57) ABSTRACT

The present disclosure provides an identification code recognition system, including: a camera configured to capture an image of an entire area of an identification code (ID code) engraved on a workpiece; a scanner configured to scan a partial area including at least one misrecognized character in the entire area of the ID code; and an image analyzer including a memory and a processor, wherein the memory is configured to store the ID code, data related to the ID code, an image captured by the camera, and an image scanned by the scanner, and the processor is configured to analyze the image captured by the camera and the image scanned by the scanner based on an image analysis logic.

8 Claims, 9 Drawing Sheets

(56) References Cited

U.S. PATENT DOCUMENTS

| | | | |
|---|---|---|---|
| 6,779,716 B1* | 8/2004 | Grow | F41A 21/00 |
| | | | 235/375 |
| 7,655,882 B2* | 2/2010 | Kaplan | B23K 26/032 |
| | | | 219/121.68 |
| 7,915,564 B2* | 3/2011 | Kaplan | B23K 26/032 |
| | | | 219/121.68 |
| 9,790,029 B2 | 10/2017 | Kim | |
| 10,586,318 B2* | 3/2020 | Stone | G06N 3/0436 |
| 2001/0053981 A1* | 12/2001 | Wyssen | G06O 30/0601 |
| | | | 340/572.1 |
| 2006/0023945 A1* | 2/2006 | King | H04N 1/00204 |
| | | | 382/173 |
| 2009/0028379 A1* | 1/2009 | Belanger | F42B 35/00 |
| | | | 382/100 |

* cited by examiner

IDENTIFICATION CODE RECOGNITION SYSTEM AND METHOD

CROSS-REFERENCE TO RELATED APPLICATION

The present application claims priority to and the benefit of Korean Patent Application No. 10-2018-0073968, filed on Jun. 27, 2018, which is incorporated herein in its entirety by reference.

TECHNICAL FIELD

The present disclosure relates to a system and a method for vehicle information identification and, more particularly, to an identification code recognition system and method capable of accurately recognizing an identification code (ID code) engraved on a workpiece such as a vehicle identification number (VIN) engraved on a vehicle body.

BACKGROUND

The statements in this section merely provide background information related to the present disclosure and may not constitute prior art.

Generally, automobile makers manufacture vehicles by assembling 20,000 to 30,000 parts/components on a number of assembly lines in all mass production processes. A vehicle body is a first stage in the automobile manufacturing process. After a body panel is produced in a pressing process, it is transferred to a body shop, where body parts/components are assembled to form a body in white (BIW).

A unique vehicle identification number (VIN) is given to each vehicle body. The VIN is used to prevent vehicle theft, track vehicle defects, and the like.

VINs are individually assigned according to types of vehicles entering corresponding processes in a body assembly plant. The VIN is engraved on a portion of the vehicle body by an engraving pin, a laser beam, or the like.

The vehicle body with the engraved VIN is conveyed along a vehicle body conveyance line, and side panels, a roof panel, a rear panel, and the like are mounted on the vehicle body. After painting of the vehicle body is completed, various kinds of convenience devices together with an engine, transmission, and interior and exterior materials, are assembled into the vehicle body. Here, the VIN engraved on the vehicle body is recognized, and parts/components corresponding to the vehicle type are mounted according to the recognized information.

In order to recognize the VIN, after the engraved VIN is captured by a general camera, its captured image is stored, and is then subjected to an image analysis technique such as pattern matching and optical character recognition (OCR).

Meanwhile, the engraving quality of an identification code (ID code) on a workpiece, such as the VIN on the vehicle body, may not be consistent due to the wear of the engraving pin or the change of the laser beam profile. In addition, when the camera captures an image of the engraved ID code, illumination (brightness of light) may frequently change depending on changes in time, space, etc. The captured image of the ID code may not be clear according to changes in process conditions, and thus it is necessary to change (manage) reference patterns used for image analysis. When the reference patterns are not changed according to changes in process conditions, the captured image of the ID code may frequently be misrecognized, and an operator may be required to confirm such an ID code misrecognition, resulting in workforce waste.

In order to cope with this problem, it may be an alternative to apply a 3D scanning technique instead of the camera. However, when the 3D scanning technique is applied to the overall ID code recognition process, the cost may be relatively increased, and a cycle time of ID code recognition may also be increased, resulting in lower productivity.

The matters described in the background section are provided to assist in understanding the background of the present disclosure, and may include any technical concept which is not considered as the prior art known to those skilled in the art.

SUMMARY

An aspect of the present disclosure provides an identification code recognition system and method capable of accurately recognizing an identification code (ID code) engraved on a workpiece such as a vehicle identification number (VIN) engraved on a vehicle body.

In one form of the present disclosure, an identification code recognition system may include: a camera capturing an image of an entire area of an ID code engraved on a workpiece; a scanner scanning a partial area including at least one misrecognized character in the entire area of the engraved ID code; and an image analyzer including a memory and a processor, wherein the memory stores the engraved ID code, data related to the engraved ID code, the image captured by the camera, and an image scanned by the scanner, and the processor analyzes the image captured by the camera and the image scanned by the scanner on the basis of image analysis logic.

The processor may perform a first image analysis comparing the image captured by the camera with a reference pattern to obtain a recognition result value with respect to the captured image.

The processor may perform a secondary image analysis comparing the image scanned by the scanner with the reference pattern to obtain a partial correction value with respect to the scanned image.

The processor may combine the recognition result value with the partial correction value to obtain a final result value.

The identification code recognition system may further include: an engraver head which is movable toward the workpiece by a robot; an engraver disposed in the engraver head and engraving the ID code on the workpiece; and an engraver controller having a memory storing data with respect to the ID code, and controlling an operation of the engraver.

The engraver head may include a body having a first receiving hollow which receives the engraver, and a second receiving hollow which receives the camera and the scanner.

The engraver may be movably mounted in the first receiving hollow to move along a biaxial direction.

In another form of the present disclosure, an identification code recognition method may include: receiving a identification code (ID code) corresponding to a workpiece from a manufacturing execution system (MES); obtaining a first image of an entire area of the ID code engraved on the workpiece; obtaining a recognition result value with respect to the first image through first image analysis logic by which the first image is compared with a reference pattern; comparing the recognition result value with the ID code received from the MES to determine whether misrecognition occurs; obtaining a second image of a partial area including at least one misrecognized character when it is determined that at least one character of the recognition result value is misrecognized; obtaining a partial correction value with respect to the second image through second image analysis logic by which the second image is compared with the reference pattern; and obtaining a final result value by removing the at least one misrecognized character from the recognition result value and combining the recognition result value with the partial correction value.

The first image may be captured by a camera.

The second image may be scanned by a scanner.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
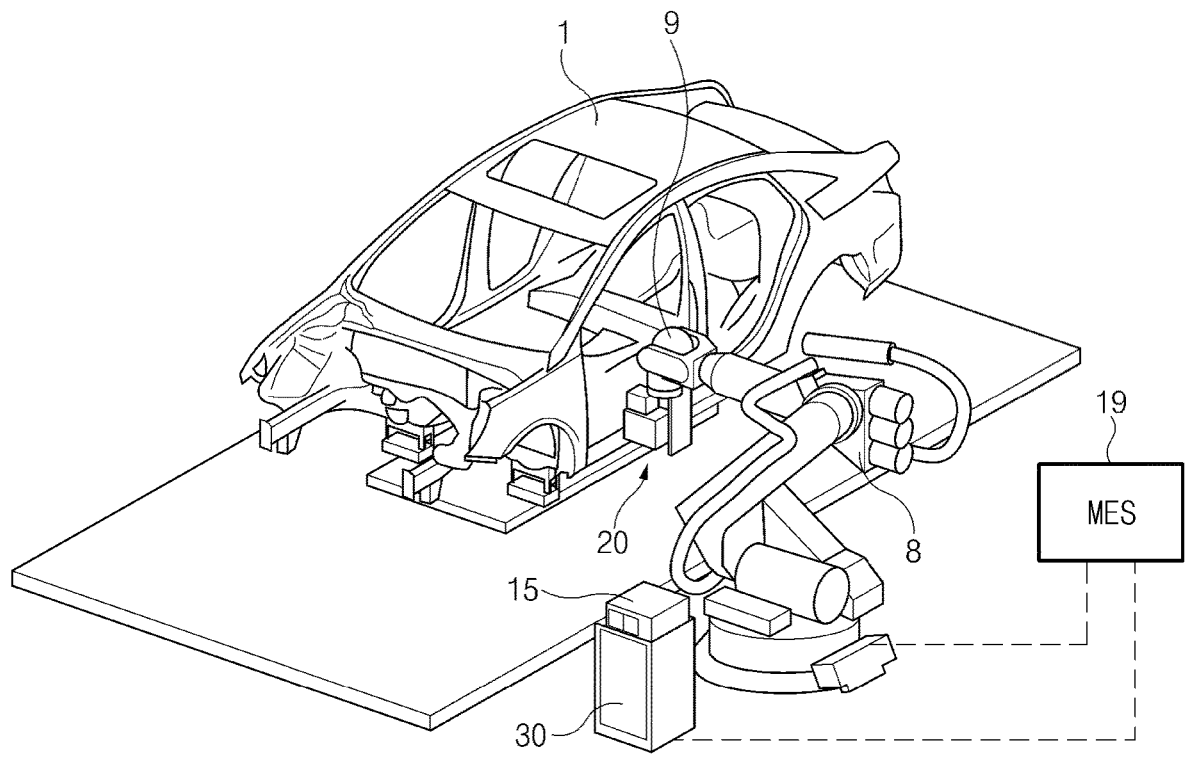
FIG. 1 illustrates a perspective view of an identification code recognition system in one form of the present disclosure.
Figure 2:
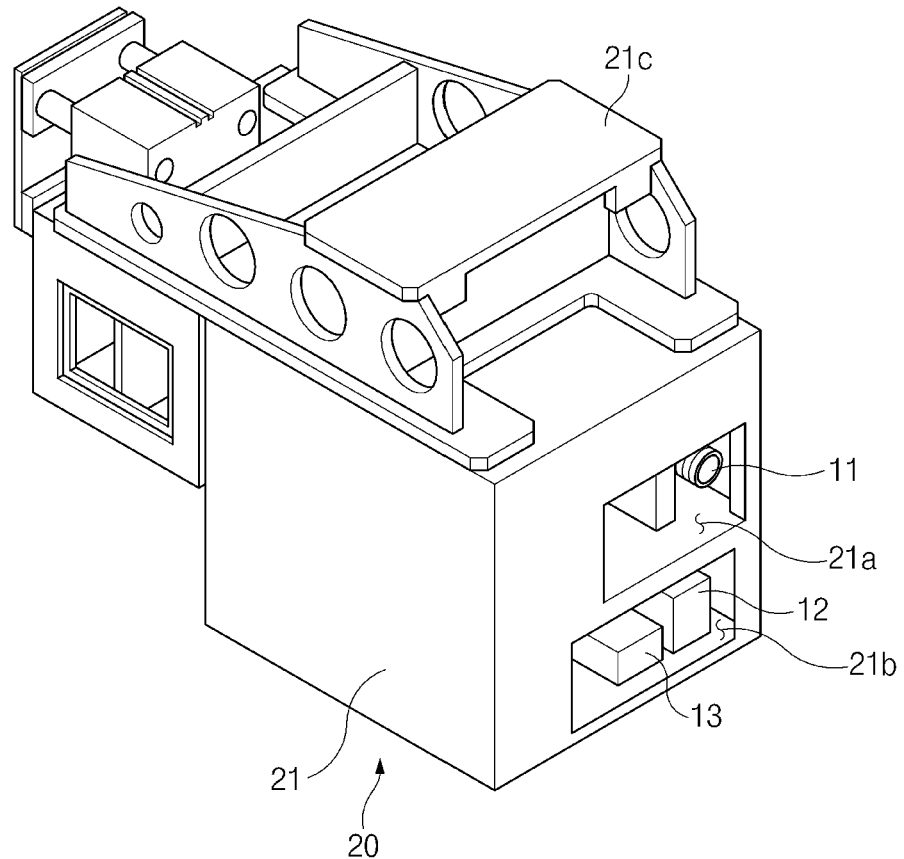
FIG. 2 illustrates a perspective view of an engraver head in an identification code recognition system in one form of the present disclosure.
Figure 3:
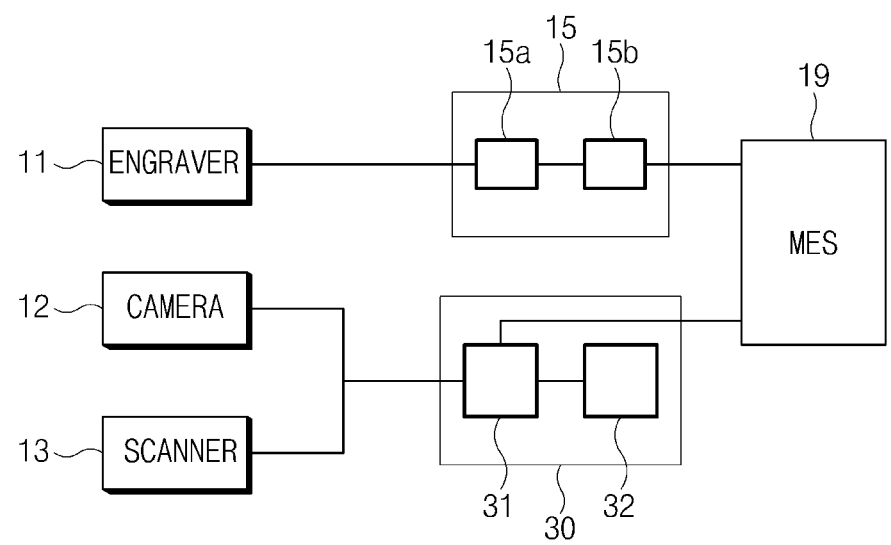
FIG. 3 illustrates a block diagram of the configuration of an identification code recognition system in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary forms of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIGS. 1 to 3 and 6, an identification code recognition system 10 in some forms of the present disclosure may include an engraver head 20 having an engraver 11 engraving an identification code (ID code) 2 on a workpiece 1, a camera 12 capturing an image of an entire area 5 of the ID code 2 engraved on the workpiece 1, and a scanner 13 scanning only a partial area 6 in which misrecognition occurs in the entire area 5 of the engraved ID code 2.

The ID code 2 may be at least one character string containing various characters such as alphabetic characters, numeric characters, special characters, and other foreign characters in order to identify the workpiece 1.

For example, as illustrated in FIG. 1, the workpiece 1 may be a vehicle body, especially a body in white (BIW), and the ID code 2 may be a vehicle identification number (VIN) engraved on the surface of the vehicle body, especially a seat crossmember of the BIW.

The engraver head 20 may be movable toward the workpiece 1 by a robot 8, and the engraver head 20 may include a body 21 having first and second receiving hollows 21a and 21b in which the engraver 11, the camera 12, and the scanner 13 are received.

The body 21 of the engraver head 20 may have a mounting surface 21c to which an arm 9 of the robot 8 is connected, and the engraver head 20 may move close to the workpiece 1 by the operation of the robot 8.

The engraver 11 may be movably mounted in the first receiving hollow 21a of the body 21. In particular, the engraver 11 may move along a biaxial direction of an orthogonal coordinate system on the surface of the workpiece 1.

The engraver 11 may be connected to an engraver controller 15, and the engraver controller 15 may control the operation of the engraver 11. The engraver controller 15 may include a processor 15a and a memory 15b. The processor 15a may be programmed to receive instructions stored in the memory 15b and transmit the instructions to the engraver 11. The memory 15b may be a data storage such as a hard disk drive, a solid state drive, a server, a volatile storage medium, or a non-volatile storage medium.

In particular, the memory 15b may store a unique ID code corresponding to the workpiece 1, the ID code and its relevant data, and the like may be received from a main server of a manufacturing execution system (MES) 19. The engraver controller 15 may control the operation of the engraver 11 in response to "the ID code received from the MES 19 and its relevant data" stored in the memory 15b of the engraver controller 15 so that the engraver 11 may engrave the corresponding ID code on the surface of the workpiece 1.

In some forms of the present disclosure, the engraver 11 may be a laser engraver which engraves the ID code on the surface of the workpiece 1 by a laser beam. The engraver controller 15 may control power of the laser beam projected from the engraver 11, and the operation, movement, and the like of the engraver 11.

In another form of the present disclosure, the engraver 11 may be a mechanical engraving tool which engraves the ID code on the surface of the workpiece 1 by an engraving pin. The engraver controller 15 may control the operation, movement, and the like of the engraver 11.

The identification code recognition system 10 in some forms of the present disclosure may have its integrated engraver 11, thereby sequentially performing an ID code engraving step and an ID code recognition step, and thus the ease of operation may be improved.

The camera 12 and the scanner 13 may be received in the second receiving hollow 21b of the body 21, and the camera 12 and the scanner 13 may be connected to an image analyzer 30.

The camera 12 may be a 2D camera or a vision camera capturing the image of the entire area 5 of the ID code 2 engraved on the workpiece 1, and the image (see FIG. 6) captured by the camera 12 may be input to a memory 31 of the image analyzer 30, and be analyzed by a processor 32 of the image analyzer 30 so that the image analyzer 30 may obtain a recognition result value 51 (see FIG. 7) with respect to the entire area 5 of the ID code 2.

The scanner 13 may scan only the partial area 6 including at least one misrecognized character which is determined as misrecognition by the image analyzer 30 in the entire area 5 of the engraved ID code 2 to thereby produce a scanned image of the partial area 6 of the ID code 2. A scanning frequency of the scanner 13 may be terahertz, IR (infrared ray), visible light, UV (ultraviolet ray), or the like.

The image scanned by the scanner 13 may be input to the memory 31 of the image analyzer 30, and be analyzed by the processor 32 of the image analyzer 30 so that the image analyzer 30 may obtain a partial correction value 52 (see FIG. 8) with respect to the partial area 6.

Figure 4:
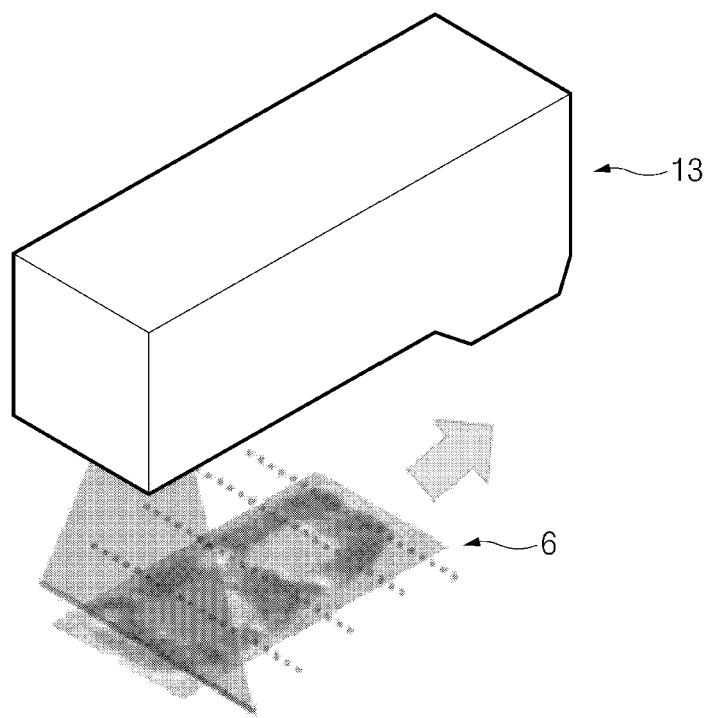
FIG. 4 illustrates a first example of a scanner in an identification code recognition system in one form of the present disclosure.

In some forms of the present disclosure, as illustrated in FIG. 4, the scanner 13 may scan the partial area 6 of the ID code 2 by line profile scanning while the scanner 13 or the workpiece 1 is moving.

Figure 5:
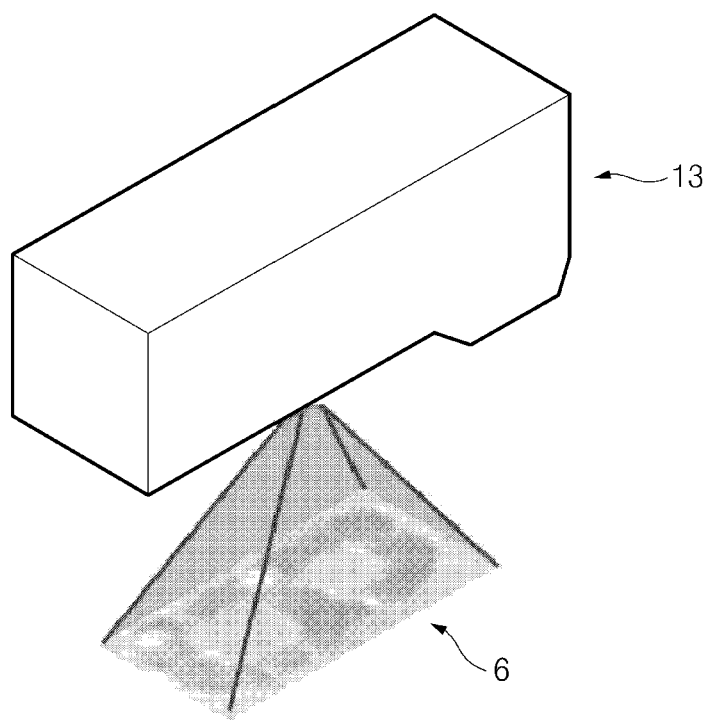
FIG. 5 illustrates a second example of a scanner in an identification code recognition system in one form of the present disclosure.

In another form of the present disclosure, as illustrated in FIG. 5, the scanner 13 may scan the partial area 6 of the ID code 2 by snapshot scanning.

The image analyzer 30 may include the memory 31 and the processor 32. The memory 31 may store a reference pattern for analyzing the image of the ID code engraved on the workpiece 1. In addition, the memory 31 may store the image captured by the camera 12 and the image scanned by the scanner 13.

The processor 32 may be programmed to analyze the image captured by the camera 12 and the image scanned by the scanner on the basis of image analysis logic such as pattern matching, and optical character recognition (OCR).

Figure 6:
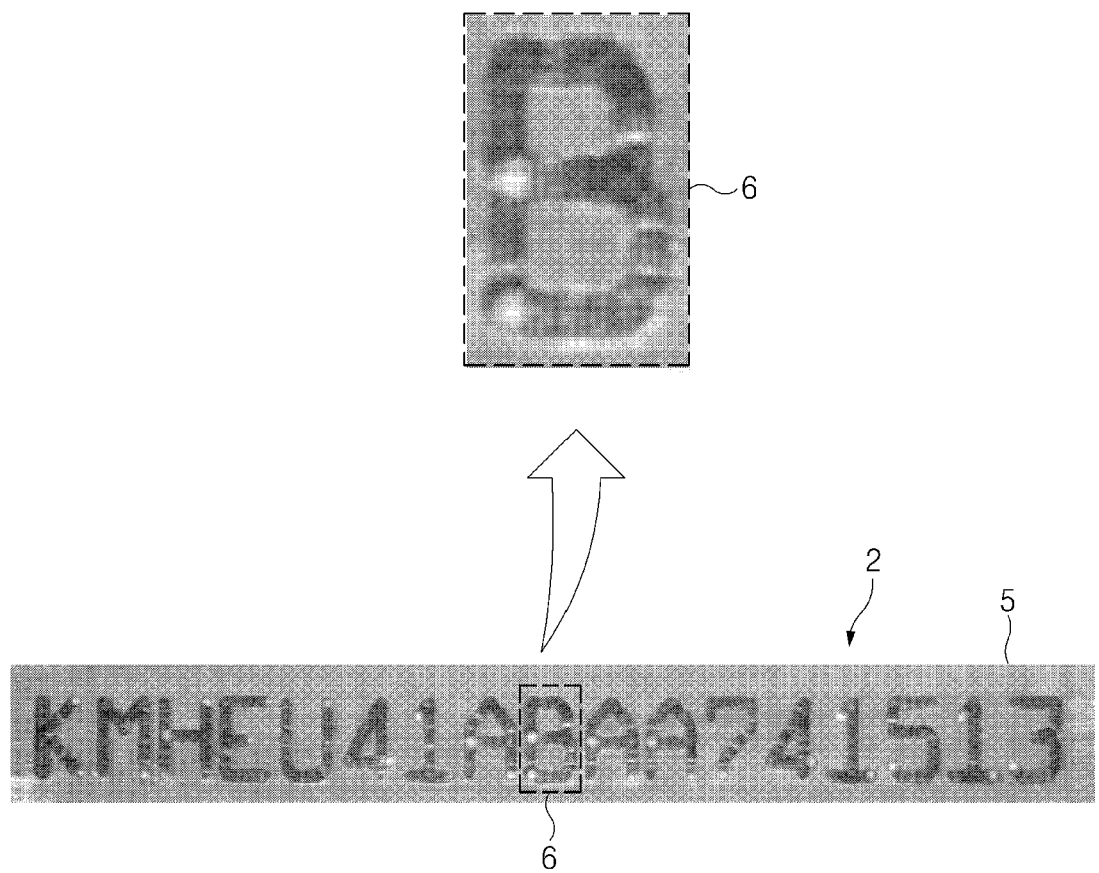
FIG. 6 illustrates an example of an image of an identification code (ID code) engraved on a workpiece captured by a camera.
Figure 7:
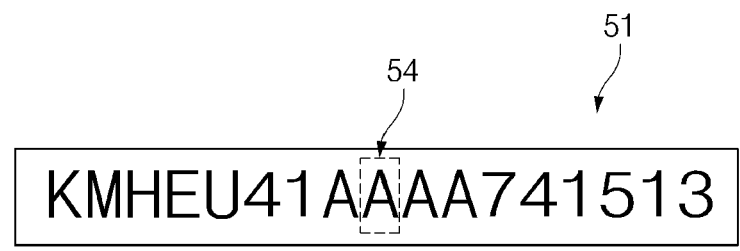
FIG. 7 illustrates a recognition result value of the image illustrated in FIG. 6 recognized by an image analyzer.

The processor 32 may perform a first image analysis comparing the image (see FIG. 6) captured by the camera 12 with the reference pattern to thereby obtain the recognition result value 51 with respect to the captured image as illustrated in FIG. 7. The processor 32 may compare the recognition result value 51 with "the ID code received from the MES 19" stored in the memory 31 of the image analyzer 30 to determine whether or not misrecognition occurs.

Meanwhile, when the engraving pin of the engraver (mechanical engraving tool) 11 is worn or the laser beam profile of the engraver (laser engraver) 11 is changed, the engraving quality of the ID code engraved on the surface of the workpiece 1 may not be consistent. In addition, when the camera 12 captures an image of a vehicle identification number (VIN), illumination (brightness of light) may frequently change depending on changes in conditions such as season, time, and space. Due to changes in such process conditions, the captured image of the engraved ID code may not be clear. FIG. 6 illustrates an example of the image of the ID code 2 engraved on the workpiece 1 captured by the camera 12. As illustrated in FIG. 6, character "B" positioned in the partial area 6 of the ID code 2 engraved on the workpiece 1 may not be clear due to changes in process conditions. As illustrated in the enlarged view of FIG. 6, it may be confusing whether character "B" is character "A" or character "B". In this case, the processor 32 may misrecognize that character "B" in the partial area 6 of the ID code 2 matches character "A." in the reference pattern during the first analysis. Thus, as can be seen in the recognition result value 51 of FIG. 7, character "B" in the partial area 6 of the ID code 2 may be misrecognized as character "A". When at least one character 54 of the recognition result value 51 does not match "the ID code received from the MES 19", the processor 32 may determine that misrecognition has occurred in the partial area 6 of the ID code 2 as illustrated in FIGS. 6 and 7. Then, the processor 32 may control the operation of the scanner 13 such that the scanner 13 may move to the partial area 6 including the misrecognized character 54 and scan only the corresponding partial area 6.

Figure 8:
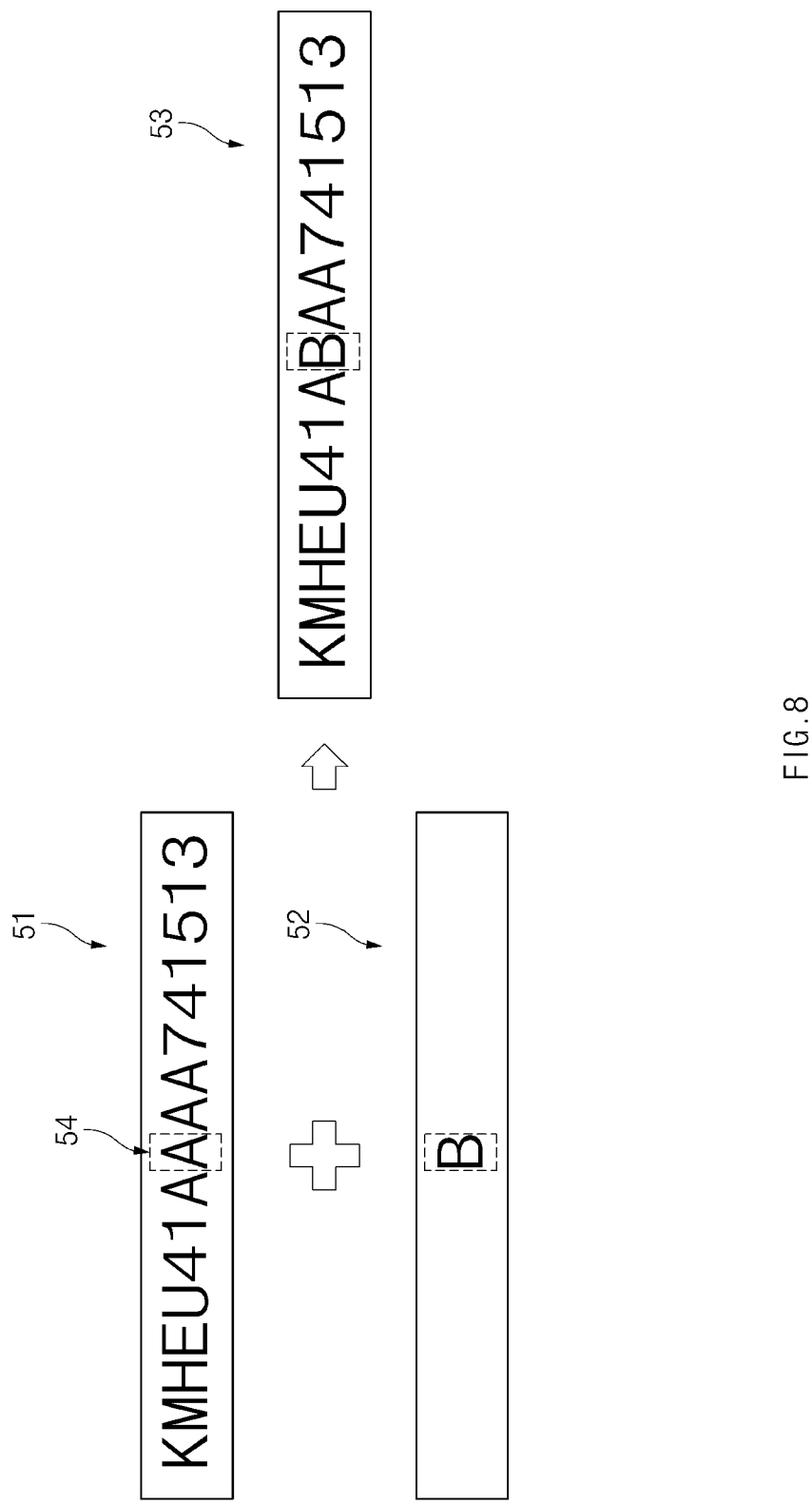
FIG. 8 illustrates a process of obtaining a final result value by combining a recognition result value with a partial correction value.

The processor 32 may perform a secondary image analysis comparing the image scanned by the scanner 13 with the reference pattern to thereby obtain the partial correction value 52 with respect to the scanned image as illustrated in FIG. 8.

The processor 32 may compare the partial correction value 52 with "the ID code received from the MES 19" to determine whether or not misrecognition occurs. When the partial correction value 52 matches "the ID code received from the MES 19", the processor 32 may remove the misrecognized character 54 from the recognition result value 51, and combine the recognition result value 51 with the partial correction value 52 to thereby obtain a final result value 53 as illustrated in FIG. 8. The processor 32 may compare the final result value 53 with "the ID code received from the MES 19" to determine whether or not misrecognition occurs.

Figure 9:
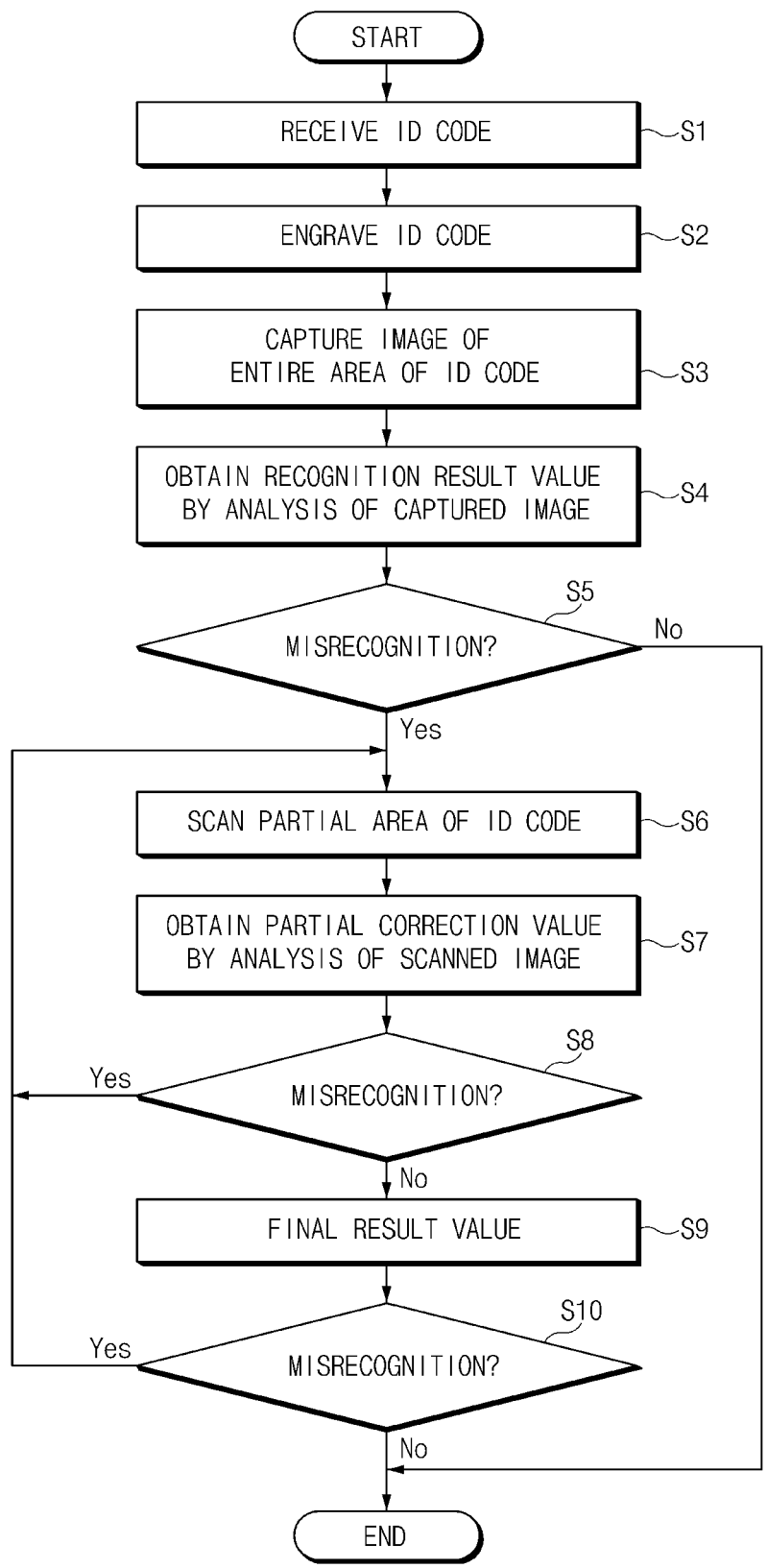
FIG. 9 illustrates a flowchart of an identification code recognition method in one form of the present disclosure.

FIG. 9 illustrates a flowchart of an identification code recognition method in some forms of the present disclosure.

The engraver controller 15 and the image analyzer 30 may receive a unique ID code corresponding to the workpiece 1 and its relevant data from the main server of the MES 19 (S1), and "the ID code received from the MES 19" and its relevant data may be stored in the memory 15b of the engraver controller 15 and the memory 31 of the image analyzer 30.

The engraver controller 15 may control the operation of the engraver 11 according to "the ID code received from the MES 19" and the relevant data such that the engraver 11 may engrave the corresponding ID code on the surface of the workpiece 1 (S2).

The camera 12 may capture an image of the entire area 5 of the ID code 2 engraved on the workpiece 1 (S3).

The image (see FIG. 6) captured by the camera 12 may be input to the memory 31 of the image analyzer 30. The processor 32 may obtain a recognition result value 51 on the basis of first image analysis logic by which the image captured by the camera 12 is compared with a reference pattern (S4).

The processor 32 may compare the recognition result value 51 with "the ID code received from the MES 19" to determine whether or not misrecognition occurs (S5).

When at least one character 54 of the recognition result value 51 does not match "the ID code received from the MES 19" (that is, when the processor 32 misrecognizes at least one character 54 of the recognition result value 51), the processor 32 may determine that misrecognition has occurred in at least the partial area 6 (including the misrecognized character 54) of the entire area 5 of the ID code 2 as illustrated in FIGS. 6 and 7. The processor 32 may control the operation of the scanner 13 such that the scanner 13 may move to the partial area 6 in which misrecognition has occurred in the entire area 5 of the ID code 2, and scan the corresponding partial area 6 (S6).

An image scanned by the scanner 13 (see FIGS. 4 and 5) may be input to the memory 31 of the image analyzer 30, and the processor 32 may obtain a partial correction value 52 with respect to the partial area 6 of the ID code 2 on the basis of second image analysis logic by which the image scanned by the scanner 13 is compared with the reference pattern (S7).

The processor 32 may compare the partial correction value 52 with "the ID code received from the MES 19" to determine whether or not misrecognition occurs (S8).

When the partial correction value 52 matches "the ID code received from the MES 19", the processor 32 may remove the misrecognized character 54 from the recognition result value 51, and combine the recognition result value 51 with the partial correction value 52 to thereby obtain a final result value 53 as illustrated in FIG. 8 (S9).

The processor 32 may compare the final result value 53 with "the ID code received from the MES 19" to determine whether or not misrecognition occurs (S10).

As set forth above, the identification code recognition system and method in some forms of the present disclosure may recognize an ID code engraved on a workpiece more accurately by capturing, by the camera, an image of the entire area of the engraved ID code, scanning, by the scanner, a partial area including at least one misrecognized character in the captured image, and combining the captured image and the scanned image.

Hereinabove, although the present disclosure has been described with reference to some forms of the present disclosure and the accompanying drawings, the present disclosure is not limited thereto, but may be variously modified and altered by those skilled in the art to which the present disclosure pertains without departing from the spirit and scope of the present disclosure claimed in the following claims.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An identification code recognition system, comprising:
a camera configured to capture an image of an entire area of an identification code (ID code) that is engraved on a workpiece;
a scanner configured to scan a partial area including at least one misrecognized character in the entire area of the ID code;
an engraver head that is movable toward the workpiece by a robot;
an engraver disposed in the engraver head and configured to engrave the ID code on the workpiece;
an engraver controller comprising a memory that is configured to store data regarding the ID code, wherein the engraver controller is configured to control an operation of the engraver; and
an image analyzer comprising a memory and a processor, wherein the memory is configured to store the ID code, data related to the ID code, an image of the entire area captured by the camera, and an image of the partial area scanned by the scanner, and
the processor is configured to analyze the image of the entire area captured by the camera and the image of the partial area scanned by the scanner based on an image analysis logic,
wherein the engraver head comprises a body having a first receptacle configured to receive the engraver, and a second receptacle configured to receive the camera and the scanner.

2. The identification code recognition system of claim 1, wherein the processor is configured to perform a first image analysis to obtain a recognition result value of the image of the entire area captured by the camera, wherein the first image analysis compares the image of the entire area captured by the camera with a reference pattern.

3. The identification code recognition system of claim 2, wherein the processor is configured to perform a secondary image analysis to obtain a partial correction value of the image of the partial area scanned by the scanner, wherein the secondary image analysis compares the image of the partial area scanned by the scanner with the reference pattern.

4. The identification code recognition system of claim 3, wherein the processor is configured to combine the recognition result value and the partial correction value to obtain a final result value.

5. The identification code recognition system of claim 1, wherein the engraver is movably mounted in the first receptacle to move along a biaxial direction.

6. An identification code recognition method using the identification code recognition system of claim 1, comprising:
receiving an identification code (ID code) corresponding to a workpiece from a manufacturing execution system (MES);
obtaining a first image of an entire area of the ID code engraved on the workpiece;
obtaining a recognition result value of the first image through first image analysis logic, wherein the first image analysis logic compares the first image with a reference pattern;
comparing the recognition result value with the ID code received from the MES to determine whether misrecognition occurs;
when it is determined that at least one character of the recognition result is misrecognized, obtaining a second image of a partial area including at least one misrecognized character;
obtaining a partial correction value of the second image through second image analysis logic, wherein the second image analysis logic compares the second image with the reference pattern; and
obtaining a final result value by removing the at least one misrecognized character from the recognition result value and by combining the recognition result value and the partial correction value.

7. The identification code recognition method of claim 6, wherein the first image is captured by a camera.

8. The identification code recognition method of claim 6, wherein the second image is scanned by a scanner.

* * * * *